April 2, 1963 W. BRENNER ETAL 3,083,904

MAGNETIC ENVELOPE MEANS

Filed Sept. 9, 1960

*INVENTORS*
WILLIAM BRENNER
SIDNEY KOSLOW 3,083,904
Patented Apr. 2, 1963

3,083,904

MAGNETIC ENVELOPE MEANS

William Brenner, 105 Neil Court, and Sidney Koslow, 111 Neil Court, both of Levittown, N.Y.

Filed Sept. 9, 1960, Ser. No. 54,901
2 Claims. (Cl. 235—61.12)

This invention relates to envelopes or containers adapted for magnetic sorting or handling by means of magnetic information impressed on the envelope or container.

This application is a continuation in part of our prior co-pending application S.N. 801,173, now Patent 3,040,-323, for Magnetic Coding filed March 23, 1959. That application discloses means for coding and sorting by means of magnetic recording of letters and articles. The present application is directed to the envelope or containers themselves.

Accordingly, a principal object of the invention is to provide new and improved envelope means adapted to receive magnetic recordings.

Another object of the invention is to provide new and improved container means adapted to receive magnetic recordings.

Another object of the invention is to provide new and improved envelope or container means for articles which are adapted to receive magnetic recordings by means of magnetic material placed on a face of said envelopes or articles, said magnetic material being either a tape, strip or film of magnetic material applied to, or magnetic material impregnated in, the container material.

Another object of the invention is to provide new and improved magnetic record means.

These and other objects of the invention will be apparent from the following specification and drawings of which:

Figure 1:
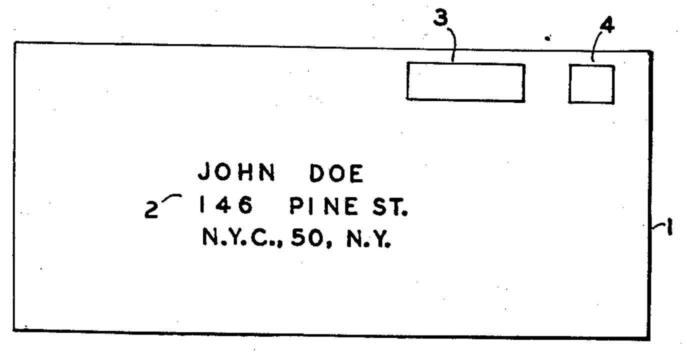
FIGURE 1 is a plan view of an embodiment of the invention.

Referring to the figures, FIGURE 1 shows an envelope 1 having written address information at 2 and having a conventional postage stamp 4. The envelope is prepared for receiving magnetic information by placing a strip of magnetic material 3 on the envelope, preferably at a predetermined location with respect to one or more edges of the envelope to facilitate registration of the magnetic area 3 with magnetically coding and reading heads.

The strip of magnetic material 3 may be a piece of magnetic tape having an adhesive thereon and adapted to be stuck on the envelope, or a film of magnetic material such as magnetic ink may be rolled or sprayed on the envelope or, alternatively, magnetic material may be impregnated in the paper of the envelope itself. The magnetic strip may be approximately 1" x 7/16".

Figure 2:
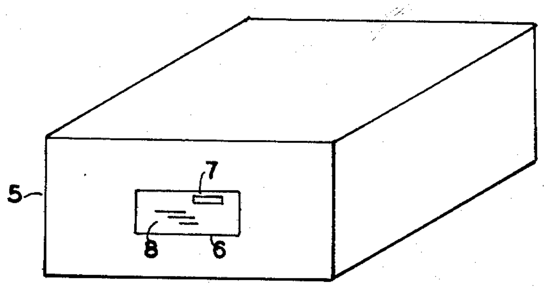
FIGURE 2 is a perspective of another embodiment of the invention.

FIGURE 2 shows an article 5 which may be a container or box. The article or box 5 may be prepared for magnetic coding and sorting by placing thereon, directly or with a label 6 having space for magnetic information 7 which may be identical to the magnetic means 3 discussed in connection with FIGURE 1. The label 6 may also contain space 8 for written information if desired.

The envelope or articles having the magnetic material placed thereon may then be coded by passing the magnetic material through the magnetic field of a magnetic recording head which may be conventional. The information may be recorded by various methods of coding, for instance, the information may be recorded in audio or binary form. The magnetic information thus recorded may be utilized by magnetic reading of the information, by passing the magnetic materials on the envelopes of articles in operative relation to a magnetic reading head which will respond to the magnetic information on the material and apply the information directly to automatic sorting or other utilization devices which may be conventional. Certain utilization devices, procedures and methods have been disclosed in our aforementioned co-pending application.

The advantages of the magnetic system over other type systems are as follows:

The magnetic system is easy to erase merely by passing it through a high frequency field. This is an important feature when it is considered that there are up to 8,000,000 changes of addresses yearly in the United States so that a large portion of the mail has to be readdressed and forwarded, but it is practically impossible to erase the coding of the other systems using patterns of dots or phosphorescent materials.

The magnetic recording is also independent of the container or envelope material and it occupies a much smaller space than any other known system. The magnetic system does not require the handling of any special chemicals such as phosphors and the magnetic recording is not sensitive to humidity or wetness. Printed dots are affected by absorbent or glossy material which makes proper definition and legibility difficult, within practical space limitations.

Therefore, the magnetic system and means are admirably suited for the sorting of mail and articles and have many advantages over previous systems.

The types of articles that may be sorted is virtually unlimited and range from letters or smaller articles to railroad cars or larger articles.

Many modifications may be made by those who desire to practice the invention without departing from the scope thereof which is defined by the following claims:

We claim:

1. An envelope comprising a sheet of material formed to provide an enclosure have a substantially rectangular surface, said surface having space to receive written address information and magnetic tape means mounted on said envelope, and positioned in predetermined manner with respect to one edge of said envelope, for purpose of registration with automatic magnetic recording and reading apparatus, said magnetic tape means being adapted to receive magnetic recordings.

2. An envelope comprising a sheet of material formed to provide an enclosure having a substantially rectangular surface, said surface having space to receive written address information and magnetic film means mounted on said envelope, and positioned in predetermined manner with respect to one edge of said envelope, for purpose of registration with automatic magnetic recording and reading apparatus, said magnetic film means being adapted to receive magnetic recordings.

References Cited in the file of this patent

UNITED STATES PATENTS

| | | |
|---|---|---|
| 2,258,106 | Bryce | Oct. 7, 1941 |
| 2,547,838 | Russell | Apr. 3, 1951 |
| 2,563,340 | Kelly | Aug. 7, 1951 |
| 2,709,001 | Stahl | May 24, 1955 |
| 2,719,629 | Robinson | Oct. 4, 1955 |
| 2,797,370 | Bennett | June 25, 1957 |
| 2,915,596 | Lyon et al. | Dec. 1, 1959 |

FOREIGN PATENTS

| | | |
|---|---|---|
| 1,046,379 | Germany | Dec. 11, 1958 |
| 1,062,465 | Germany | July 30, 1959 |
| 1,100,953 | France | Apr. 13, 1955 |
| 540,600 | Great Britain | Oct. 23, 1941 |

OTHER REFERENCES

"Electronics," vol. 25, Issue 9, pages 101–105, September 1952.